US007460133B2

(12) United States Patent
Messing et al.

(10) Patent No.: US 7,460,133 B2
(45) Date of Patent: Dec. 2, 2008

(54) OPTIMAL HIDING FOR DEFECTIVE SUBPIXELS

(75) Inventors: Dean Messing, Camas, WA (US); Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 173 days.

(21) Appl. No.: 11/397,967

(22) Filed: Apr. 4, 2006

(65) Prior Publication Data

US 2007/0230818 A1 Oct. 4, 2007

(51) Int. Cl.

| | |
|---|---|
| ***G09G 5/00*** | (2006.01) |
| ***G09G 5/02*** | (2006.01) |
| ***G06T 17/00*** | (2006.01) |
| ***G06K 9/00*** | (2006.01) |
| ***H04N 5/08*** | (2006.01) |
| ***H04N 5/21*** | (2006.01) |
| ***H04N 1/38*** | (2006.01) |
| *G06K 9/36* | (2006.01) |
| *H04N 5/00* | (2006.01) |

(52) U.S. Cl. ........................ 345/613; 345/428; 345/586; 345/589; 345/694; 348/533; 348/607; 348/630; 348/531; 358/518; 358/525; 358/463; 382/162; 382/167; 382/181; 382/252

(58) Field of Classification Search ................. 345/428, 345/581, 589, 611–618, 694–696, 698, 214, 345/55, 63; 348/531–536, 606–607, 627–631, 348/643, 663, 457, 835; 382/181, 252, 260–276, 382/254, 100, 162–167; 358/463, 533, 447–448, 358/515, 518, 519, 525

See application file for complete search history.

(56) References Cited

U.S. PATENT DOCUMENTS

| | | | | |
|---|---|---|---|---|
| 6,175,393 | B1 | 1/2001 | Ban et al. | |
| 6,184,935 | B1 | 2/2001 | Iaquinto et al. | |
| 6,549,183 | B1 | 4/2003 | Koyama | |
| 6,618,443 | B1 | 9/2003 | Kim et al. | |
| 6,681,053 | B1 | 1/2004 | Zhu | |
| 7,030,894 | B2 | 4/2006 | Allen et al. | |
| 7,034,811 | B2 | 4/2006 | Allen | |
| 2002/0146179 | A1* | 10/2002 | Handley | 382/260 |
| 2003/0222894 | A1 | 12/2003 | Toji et al. | |
| 2004/0001034 | A1 | 1/2004 | Marcotte | |
| 2004/0056866 | A1 | 3/2004 | Toji et al. | |
| 2005/0018876 | A1* | 1/2005 | Nguyen | 382/100 |
| 2005/0149593 | A1* | 7/2005 | Koster et al. | 708/300 |
| 2005/0169551 | A1* | 8/2005 | Messing et al. | 382/260 |
| 2006/0090594 | A1* | 5/2006 | Fujisawa et al. | 75/252 |
| 2006/0170712 | A1* | 8/2006 | Miller et al. | 345/695 |
| 2006/0262147 | A1* | 11/2006 | Kimpe et al. | 345/690 |
| 2007/0110290 | A1* | 5/2007 | Chang et al. | 382/128 |
| 2007/0146381 | A1* | 6/2007 | Meinds et al. | 345/582 |

FOREIGN PATENT DOCUMENTS

| | | |
|---|---|---|
| EP | 0766118 | 4/1997 |

(Continued)

*Primary Examiner*—Wesner Sajous
(74) *Attorney, Agent, or Firm*—Chernoff, Vilhauer, McClung & Stenzel

(57) ABSTRACT

A technique for the modification of sub-pixels to hide defects for defective sub-pixels.

13 Claims, 13 Drawing Sheets

Block Diagram of the formation of the Perceptual Error Functional ℰ

FOREIGN PATENT DOCUMENTS

| | | | |
|---|---|---|---|
| EP | 0810775 | | 12/1997 |
| EP | 1069759 | | 1/2001 |
| EP | 0 975 556 | B1 | 11/2001 |
| EP | 1 174 823 | A2 | 1/2002 |
| EP | 1 174 854 | A2 | 1/2002 |
| EP | 1 174 855 | A2 | 1/2002 |
| EP | 1 174 823 | A3 | 1/2003 |
| EP | 1 174 854 | A3 | 7/2003 |
| JP | 6-195048 | | 7/1994 |
| JP | 8-54855 | | 2/1996 |
| JP | 2001/075523 | | 3/2001 |
| JP | 2001/222265 | | 8/2001 |
| WO | WO 91/15843 | | 10/1991 |
| WO | WO 01/37249 | | 5/2001 |
| WO | WO 01/57835 | | 8/2001 |
| WO | WO 03/100756 | | 12/2003 |

* cited by examiner (a): Five subpixel configurationss: traditional (1D) RGB stripe, three different proposed two-dimensional arrangements, and a RGBW stripe arrangement.

(b): The five 4x4 "displays" composed of the subpixel configurations immediately above.

(a): Macropixel types (b): The 4x4 "displays" with always-off and always-on defects introduced.

(a): A pixel displaying a de-saturated color on an RGB display.

(b): An alternative way of displaying the same color using an RGBW pixel.

Top: One scanline of incoming image pixels. The pixels are color co-sited.
Bottom: One scanline of display subpixels. Display is assumed to have RGB striped geometry.

Block Diagram of the formation of the Perceptual Error Functional $\varepsilon$

Illustration of constraints for ID striped pattern

General vector-valued filtering of a vector-valued signal. Primary cross-color dependencies occur because minimized error is defined in an opponent color space instead of the input space.

Illustration of constraints for an example 2D pattern (left): Pentile II tessellating pattern. (right): Pentile pattern modified for analysis.

Example array of two-dimensional filters delivered by the optimization framework for rendering onto a panel with Pentile II subpixel geometry.

Linear Shift-varying Convolution

The shift-invariant Optimal Rendering Filters used to render the blue color plane for a striped display with no defects.

The collection of shift-varying filter kernels used to render the blue color plane for a striped display when a black subpixel constraint is included in the design process.

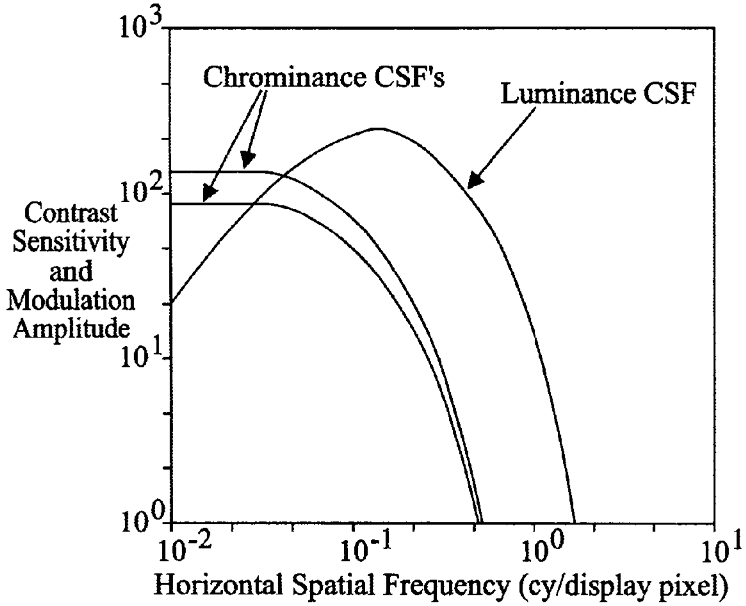

Luminance and Chrominance Contrast Sensitivity Functions. These functions show that we can see between two and three times more detail (resolution) in the luminance channel of our eyes than in the chrominance channels.

FIG. 14

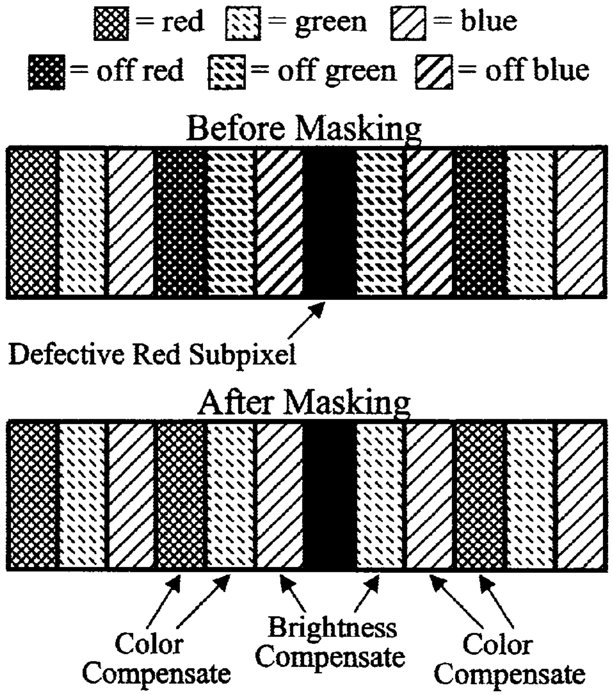

Brightness Compensate: High resolution brightness (luminance) sensitivity in HVS Color Compensate: Low resolution color (chrominance) sensitivity in HVS Effect of Shift-varying Rendering Filters in vicinity of subpixel defect.

FIG. 15

OPTIMAL HIDING FOR DEFECTIVE SUBPIXELS

CROSS-REFERENCE TO RELATED APPLICATIONS

Not applicable.

BACKGROUND OF THE INVENTION

The present invention relates to techniques for the modification of sub-pixels.

The most commonly used method for displaying images on a color mosaic display is to pre-filter and re-sample the pixels of the image to the display. In the process, the R, G, B values of selected color pixels are mapped to the separate R, G, B elements of each display pixel. These R, G, B elements of a display pixel are sometimes also referred to as sub-pixels. Because the display device does not typically allow overlapping color elements, the sub-pixels can only take on one of the three R, G, or B colors. The color's amplitude, however, can be varied throughout the entire grey scale range (e.g., 0-255). Accordingly, a rendering that maps image pixels to display sub-pixels is performed.

Referring to FIG. 1A, there exists a number of variety of different sub-pixel configurations. In general, the sub-pixel combinations can be grouped as RGB striped, RGBW striped, multi-primary, or repeating two-dimensional patterns. For each sub-pixel configuration the associated "display" is shown as a 4×4 array of sub-pixels immediately below in FIG. 1B.

Active matrix liquid crystal display panels achieve their images, in part, because of the individual transistor and capacitor placed at each sub-pixel. The transistor and capacitor latch the data to the pixel electrode that controls the amount of backlight that passes through a given sub-pixel. Occasionally, one or more transistors will malfunction, resulting in one or more defective sub-pixels. There are at least two ways a transistor can fail. One failure mode, a permanently open circuited transistor, results in an always-off or always-on sub-pixel. Another mode of failure, a permanently short circuited transistor, results in a sub-pixel whose brightness value varies over time but in a way not directly tied to the image data to which it should be associated. Also, the sub-pixels may be stuck at an intermediate constant value or may vary in some manner based upon the state of the display, such as the data currently in the frame buffer.

Always-on sub-pixels appear as randomly placed red, blue, and/or green elements on an all-black background. Always-off sub-pixels appear as black or colored dots on all-white or colored backgrounds. The probability of always-on and always-off sub-pixel defects depends on the LCD process. In the most general case, a defective sub-pixel is a sub-pixel whose output light value can not be controlled.

By way of example, the data in the frame buffer may vary the pixel value when the row driver connection to the defective sub-pixel is damaged such that the sub-pixel is always "enabled." In this case, as the scan lines are written to the column drivers, the signal to the faulty sub-pixels will fluctuate according to the instantaneous values in the column buffer for that column. The slow temporal response will tend to make the output of the defective sub-pixel a constant for the duration of (at least) a frame period. That constant is approximately given by $$f\left(\sum_{i=0}^{N-1} p_i / N\right)$$

where $p_i$ is the signal input to the $i^{th}$ sub-pixel in the column containing the defective sub-pixel, N is the number of display lines, and f accounts for the temporal response of the sub-pixel and the transfer function between signal and light output. This value will generally be different from the desired output were the sub-pixel operating properly.

Referring to FIG. 2, an example of five 4×4 displays is illustrated with the always-off defective sub-pixels. It is shown that the defective sub-pixels are illustrated as black regions. In some cases, such as the right-hand configuration shown in FIG. 2, a white sub-pixel may be used to enhance the luminance of the display, without altering the color gamut. Referring to FIGS. 3A and 3B, the white sub-pixel may be used to correct for defects. As illustrated, the de-saturated portion of the pixel in FIG. 3A is transferred to the white sub-pixel in FIG. 3B. However, the same white sub-pixel, along with the additional "headroom" in the primary color pixels can be used to hide some defects in a given RGBW quadruple.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 14 illustrates luminance and chrominance CSFs.

FIG. 15 illustrates the effect of shift varying rendering filters.

DETAILED DESCRIPTION OF PREFERRED EMBODIMENT

Embodiments may be described with reference to "RGB" images or domains, or "additive color domains", or "additive color images." These terms refer to any form of multiple component image domain with integrated luminance and chrominance information, including, but not limited to, RGB domains. Embodiments may also be described with reference to "YCbCr" images or domains, "opponent color" domains, images or channels, or "color difference" domains or images. These terms refer to any form of multiple component image domain with channels which comprise distinct luminance channels and chrominance channels including, but not limited to, YCbCr, LAB, YUV, and YIQ domains. Color domains where one or more channels have an enhanced luminance component with respect to the other channels may likewise be used. One potential measure of such enhancements is if a channel has >60%, >70%, >80%, >90%, or >95% of the luminance. In addition, the enhanced luminance color domain may be as a result of implicit processing in another color domain as opposed to a traditional color transformation from one color space to another.

The system is generally described with respect to non-overlapping pixels, or otherwise spatially discrete color sub-pixels (e.g., color mosaic or matrix displays). However, the embodiments described herein may likewise be used with colors that are overlapping to a greater or lesser degree. Moreover, the images may be displayed using different sizes of pixels and/or any different colors of sub-pixels. In addition, while some of the preferred embodiments are described with respect to rectangular pixels and sub-pixels, other shapes of pixels and sub-pixels may likewise be used. Also, any particular pixel may be formed by a plurality of sub-pixels in any arrangement, some of which may be duplicated. Moreover, the display may include any structure of different colored sub-regions.

Figure 4:
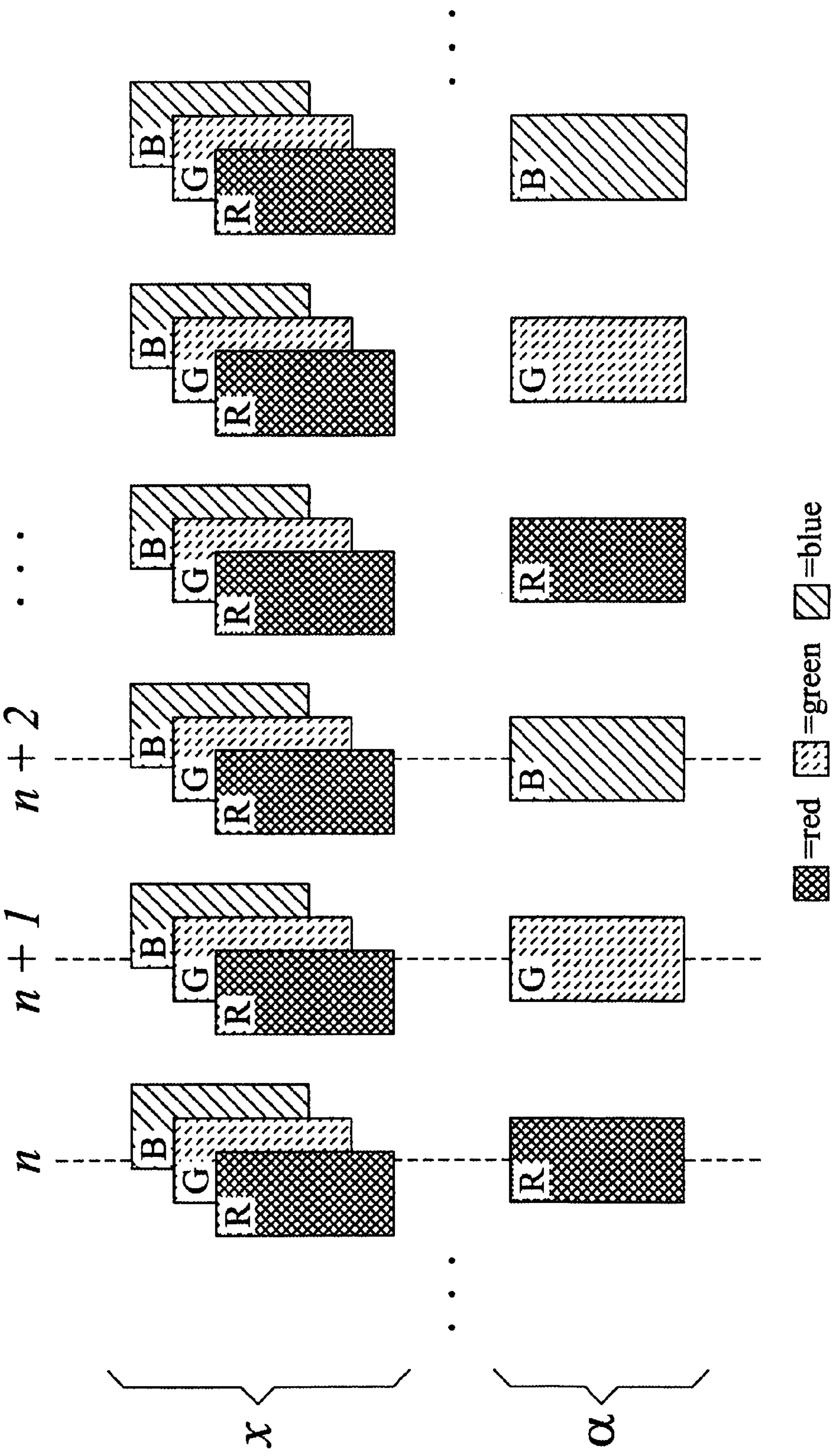
FIG. 4 illustrates a scan line of incoming image pixels.

The preferred technique for defect hiding is based upon a constrained optimal rendering framework described below. An unconstrained technique suitable for optimal rendering filter design on a striped display is first discussed followed by a constrained technique for optimal rendering filter design on arbitrary display geometries. An unconstrained optimization may be based upon a desire to minimize a perceptually relevant error, $\epsilon(\alpha)$, between a scan line of color co-sited image samples, x, sampled at the sub-pixel locations of the target display, and the corresponding flat panel display scan line of R, G, and B sub-pixels, $\alpha$. FIG. 4 depicts x and $\alpha$ where the sub-pixel location along the scan line is indexed by n.

Each $x_n$ is a vector valued quantity that represents the RGB value of the incoming image pixel at position n. Scalar valued display sub-pixels are denoted by $\alpha_n$. The RGB striped display geometry dictates that $\alpha_n$ alternatively represents a red, green, or blue sub-pixel as a function of n mod 3.

The error $\epsilon(\alpha)$ to be minimized with respect to $\alpha$ is constructed by first forming the spatial error signal:

$$E_n = M_n\alpha_n - Cx_n$$

where C is a 3×3 color transformation matrix that maps $x_n$ into a perceptually relevant opponent color space, and where $M_n = 3C_{n \bmod 3}$, $C_n$ being the $n^{th}$ column of C. The error signal E is then transformed to the Fourier domain and the opponent color components of the transformed signal are perceptually weighted. Finally $\epsilon(\alpha)$ is formed as the sum of the $1_2$ norms of the weighted Fourier color components. Thus $\epsilon$ is a weighted quadratic function of the Fourier transform of $\{E_n\}$ and hence possesses a unique minimum.

The optimal solution, $\underline{\alpha}$, satisfies $\nabla\epsilon(\underline{\alpha})=0$. That is, $\underline{\alpha}$ is the scan line of sub-pixel values that minimizes $\epsilon(\alpha)$. The quadratic form of $\epsilon$ implies that the gradient may be written as an affine system $\nabla\epsilon = A\alpha - r$. Furthermore, the structure of A allows one to extract, from the solution to this equation, rendering filter kernels which, when convolved in the proper way with the incoming scan line, yields $\underline{\alpha}$.

It may be observed that this rendering filter design is an unconstrained optimization procedure. No explicit mathematical constraints were imposed during the optimization technique described above. There are, to be sure, implicit constraints in the formation of $\epsilon$, namely those inherent in the definition of $\alpha$. The color of a particular $\alpha_n$ may be one component color of the input color space, typically not a vector combination of primaries. Furthermore, the sequence of colors that $\alpha_n$ encodes is determined implicitly by $M_n$. In other words, the sub-pixel geometry of the RGB striped display is implicitly assumed by a color vector, $M_n\alpha_n$, that varies cyclically (modulo 3) with the position of the rendered sub-pixel.

One may further observe that a different sub-pixel geometry, perhaps containing additional primaries, may require a re-definition of $E_n$ as well as a re-working of the solution to $\nabla\epsilon(\alpha)=0$. This framework may be extended to general two-dimensional multi-primary sub-pixel geometries by recasting the problem as a constrained optimization. Doing this de-couples the definition of the sub-pixel geometry could be de-coupled from the formation of $\epsilon$.

Using constrained optimization images may be optimally rendered on a wide variety of regularly tessellated color matrix displays. De-coupling the sub-pixel geometry from the definition of $\epsilon$ may be done by formulating a constrained optimization of the form:

$$\nabla \epsilon(\tilde{x}) + \sum_i \lambda_i \nabla G_i(\tilde{x}) = 0 \quad (1)$$

$$\forall\, i G_i(\tilde{x}) = 0 \quad (2)$$

where the $G_i$ are constraint functions determined by the sub-pixel geometry, the $\lambda_i$ are associated Lagrange multipliers, and where $\epsilon$ is a weighted quadratic function of the two-dimensional transform $\{E_{mn}\}$ similar to that described above. $E_{mn}$ may be defined as $$E_{mn} = C(\tilde{x}_{mn} - x_{mn})$$

where C is the color transformation matrix previously described, $x_{mn}$ is the sampled scene, and $\tilde{x}_{mn}$ is an unconstrained full-color display sample at the sub-pixel indexed by (m,n). Before the constraints are imposed, an assumption is that each of the 'sub-pixels' of the target display have full color capability. To simplify the analysis one may also assume that the scene is sampled on the same lattice as $\tilde{x}$.

Figure 5:
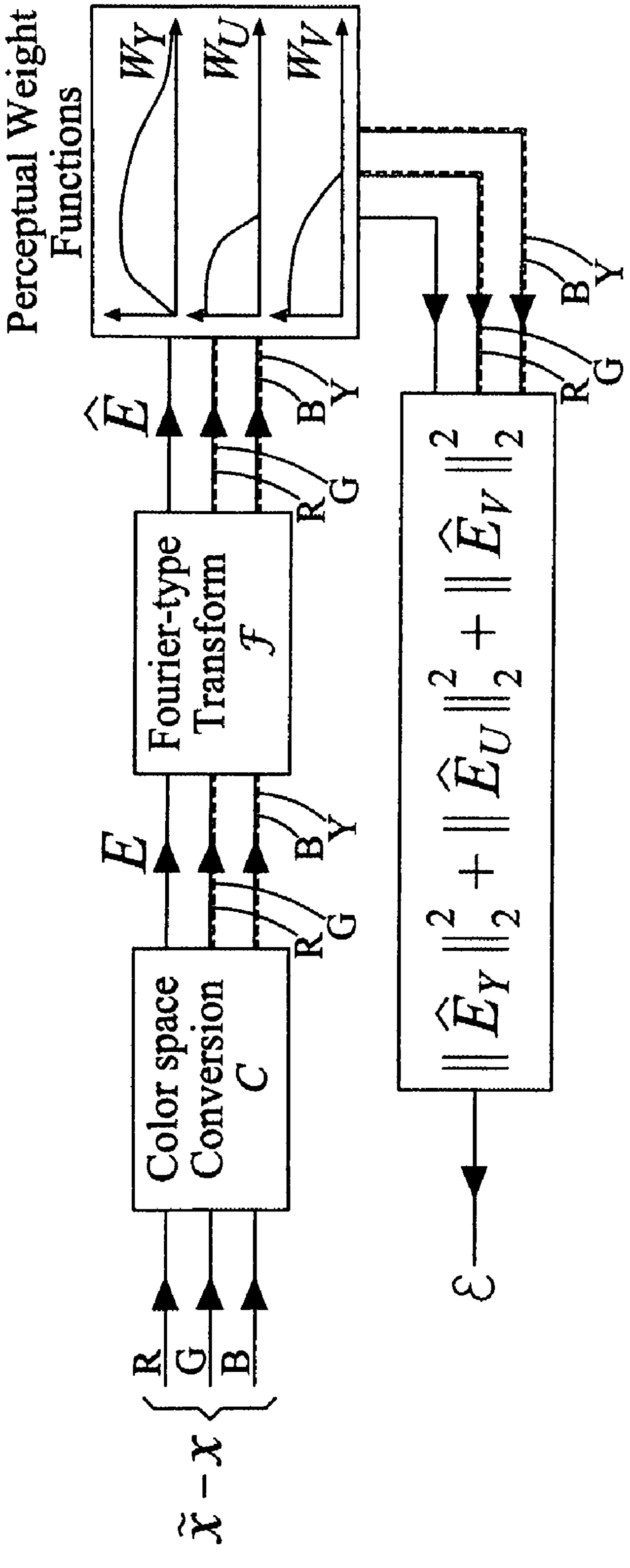
FIG. 5 illustrates the formation of the perceptual error function $\epsilon$.

The steps to the formation of the perceptual error function, $\epsilon(\tilde{x})$, are shown in FIG. 5 where YUV opponent color space is used merely as an example. The actual color transformation, C, depends on the primaries of the display to be visually optimized. The perceptual weight functions used in the formation of $\epsilon$ are preferably models of the luminance and chrominance spatial contrast sensitivity functions of the human visual systems.

Before constraints are imposed one may assume that "sub-pixels" of the target display have full-color capability. The constraint functions, $G_i$, control the behavior of each sub-pixel in the display. For example, to make a green sub-pixel at display lattice location (m,n), one defines two linear constraint functions:

$$G_{i_1}(\tilde{x}) = \tilde{x}^0_{mn},\ G_{i_2}(\tilde{x}) = \tilde{x}^2_{mn} \quad (3)$$

where $\tilde{x}_{mn}^c$ is the $c^{th}$ color component of $\tilde{x}_{mn}$. Equation 3 states that the $0^{th}$ (red) and $2^{nd}$ (blue) components of $\tilde{x}_{mn}$ will be forced to zero when equation 2 is applied. In other words, starting with a sub-pixel having a potential of red, green, and blue colors the constraints limit the sub-pixel to a single color component, namely, green.

The quadratic form of $\epsilon$ implies that the first term in equation 1 is linear: $\nabla\epsilon = A\tilde{x} - r$. Thus equations 1 and 2 may take the form $$[AG'(\tilde{x})^T]\begin{bmatrix}\tilde{x}\\ \Lambda\end{bmatrix} = r,\ G(\tilde{x}) = 0 \tag{4}$$

where G' is the (Jacobean) derivative of G, and thus $G'^T$ has $\nabla G_i$ as its $i^{th}$ column. In general, this system is non-linear due to G and G'. But constraint functions of the type used to define sub-pixel geometries are linear so $G(\tilde{x})$ reduces to $G\tilde{x}$ and $G'(\tilde{x})$ is independent of $\tilde{x}$. Therefore equation 4 can be rewritten as an augmented linear system as follows:

$$\begin{bmatrix}A & G'^T\\ G & 0\end{bmatrix}\begin{bmatrix}\tilde{x}\\ \Lambda\end{bmatrix} = \begin{bmatrix}r\\ 0\end{bmatrix} \tag{5}$$

The operators A, G' and G depend only on the display and not on the scene data. Only r is a function of the scene data. Furthermore, the simplicity of the constraint functions makes G' and G sparse, reducing the complexity of numerical solution. Also, as in the unconstrained case, the structure of A allows the extraction of convolutional, shift-invariant, rendering filters which operate on the scene and yield the optimal $\tilde{x}$. This is a consequence of the periodic nature of the applied constraints—they are the same from macro-pixel to macro-pixel.

Figure 6:
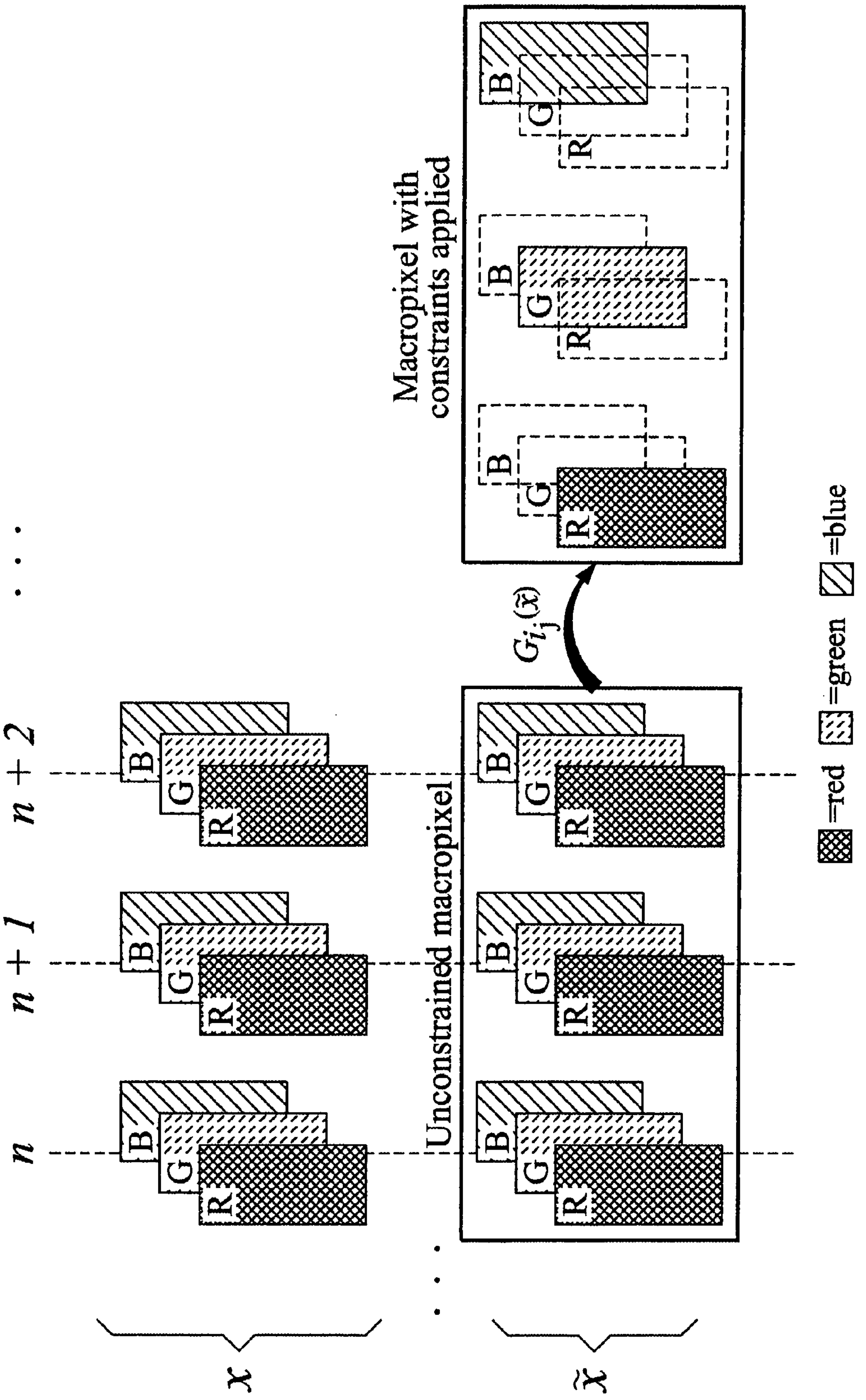
FIG. 6 illustrates constraints for 1-dimensional striped pattern.

The constraints applied to one dimensional striped geometry is illustrated in FIG. 6. FIG. 6 illustrates part of one scan line of the sampled scene, x, and, immediately below, the corresponding full color display sub-pixels, $\tilde{x}$. Sub-pixel location along the scan line is indexed by n. Before constraints are imposed there are a total of nine degrees of freedom, namely, each of the colors at each position of the unconstrained macro-pixel. When no constraints are imposed the optimal solution occurs when the full color display sub-pixels are a straight copy of the scene values since the resulting error would be zero.

In a panel the color range of each sub-pixel is limited to its particular color hue. One may insure this condition by imposing two constraints at each of the three sub-pixel sites that must be zero in order for the macro-pixel to behave properly. The zero valued sub-pixels are represented by the hollow rectangles. The six constraint functions for this macro-pixel are $$G_{i_1}(\tilde{x}) = \tilde{x}_n^1$$
$$G_{i_2}(\tilde{x}) = \tilde{x}_n^2$$
$$G_{i_3}(\tilde{x}) = \tilde{x}_{n+1}^0$$
$$G_{i_4}(\tilde{x}) = \tilde{x}_{n+1}^2$$
$$G_{i_5}(\tilde{x}) = \tilde{x}_{n+2}^0$$
$$G_{i_6}(\tilde{x}) = \tilde{x}_{n+2}^1$$

This leaves three degrees of freedom—the three actual sub-pixel intensities to be adjusted by the optimization procedure. When the optimization is performed on an interval of constrained macro-pixels within a scan line, the system of equation 5 can be solved and shift-invariant rendering filters extracted.

Figure 7:
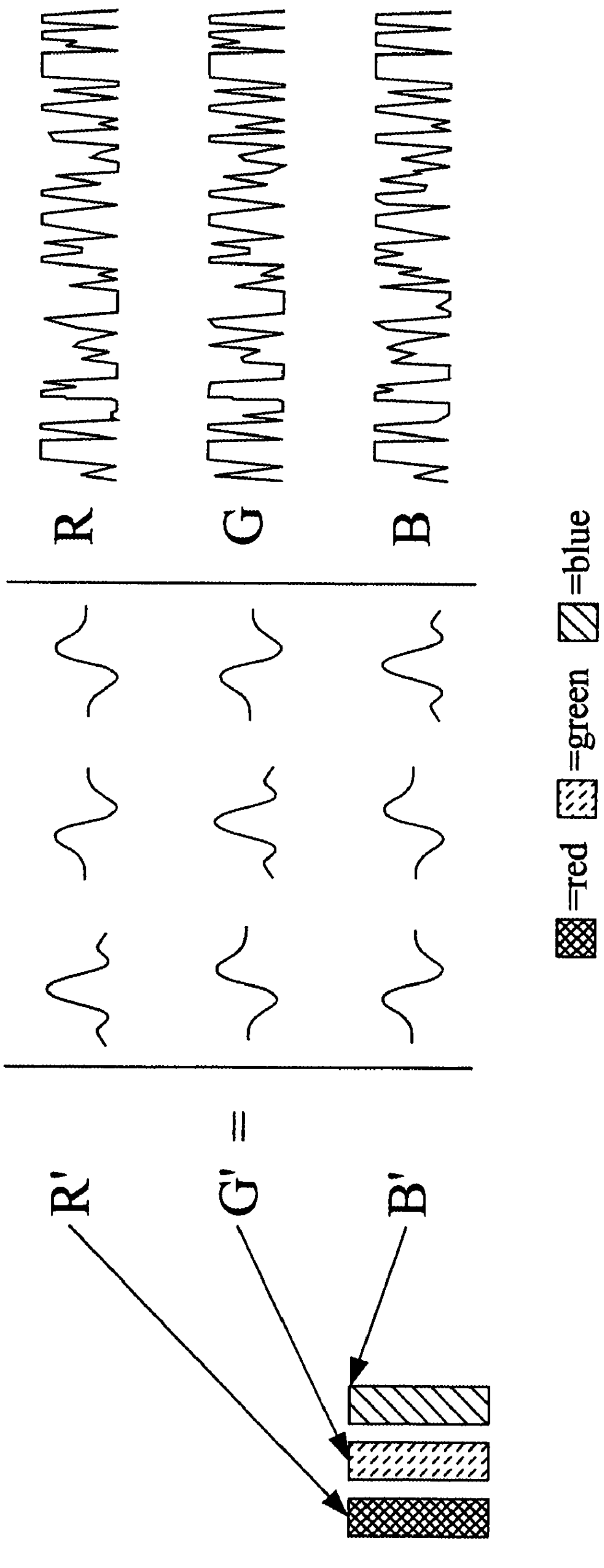
FIG. 7 illustrates general vector valued filtering of a vector valued signal

The extracted filter kernels for the previous example form an array, or matrix, of one dimensional scalar valued resampling filters, as illustrated in FIG. 7. The matrix nature of the rendering filter is due to the error measure having been defined in a color space different from the input and output color space. The value of each output sub-pixel will, in general, be a function of all input color components. FIG. 7 suggests how the filter operates on the scene data. To the right of the matrix are the three RGB color components of the incoming scene. The filters within the matrix are combined with scene data in a manner suggestive of matrix multiplication except multiplication is replaced by convolution. So, for example, the filters in the first row are convolved with the incoming color signals and the intermediate signals are added to form the red component (labeled R' in the figure) sent to the display.

Equation 6 expresses FIG. 7 in a more formal manner. The subscripts of the entries of the matrix filter indicate the input signal on the left of the arrow and the output signal on the right of the arrow. For example $h_{g\rightarrow r}$ is the filter whose input is the green component ($x^g$) of the scene on the scan line being processed, and whose output is the red $$(\tilde{x}^r)$$

display signal.

$$\begin{bmatrix}\tilde{X}^r\\ \tilde{X}^g\\ \tilde{X}^b\end{bmatrix} = \begin{bmatrix}h_{r\rightarrow r} & h_{g\rightarrow r} & h_{b\rightarrow r}\\ h_{r\rightarrow g} & h_{g\rightarrow g} & h_{b\rightarrow g}\\ h_{r\rightarrow b} & h_{g\rightarrow b} & h_{b\rightarrow b}\end{bmatrix}\begin{bmatrix}x^r\\ x^g\\ x^b\end{bmatrix} \tag{6}$$

The matrix multiplication may be interpreted as substituting for the multiplications of the inner products the convolution ($\cdot$) operator for the usual scalar multiplications. Hence, for example, $$\tilde{x}^g = (h_{r\rightarrow g}\cdot x^r) + (h_{g\rightarrow g}\cdot x^g) + (h_{b\rightarrow g}\cdot x^b).$$

One may observe from equation 6 that the sum of three individual convolutions are used to compute each component of the vector valued (r, g, b) output signal $\tilde{x}$ from the vector valued (r, g, b) input signal x.

Figure 8:
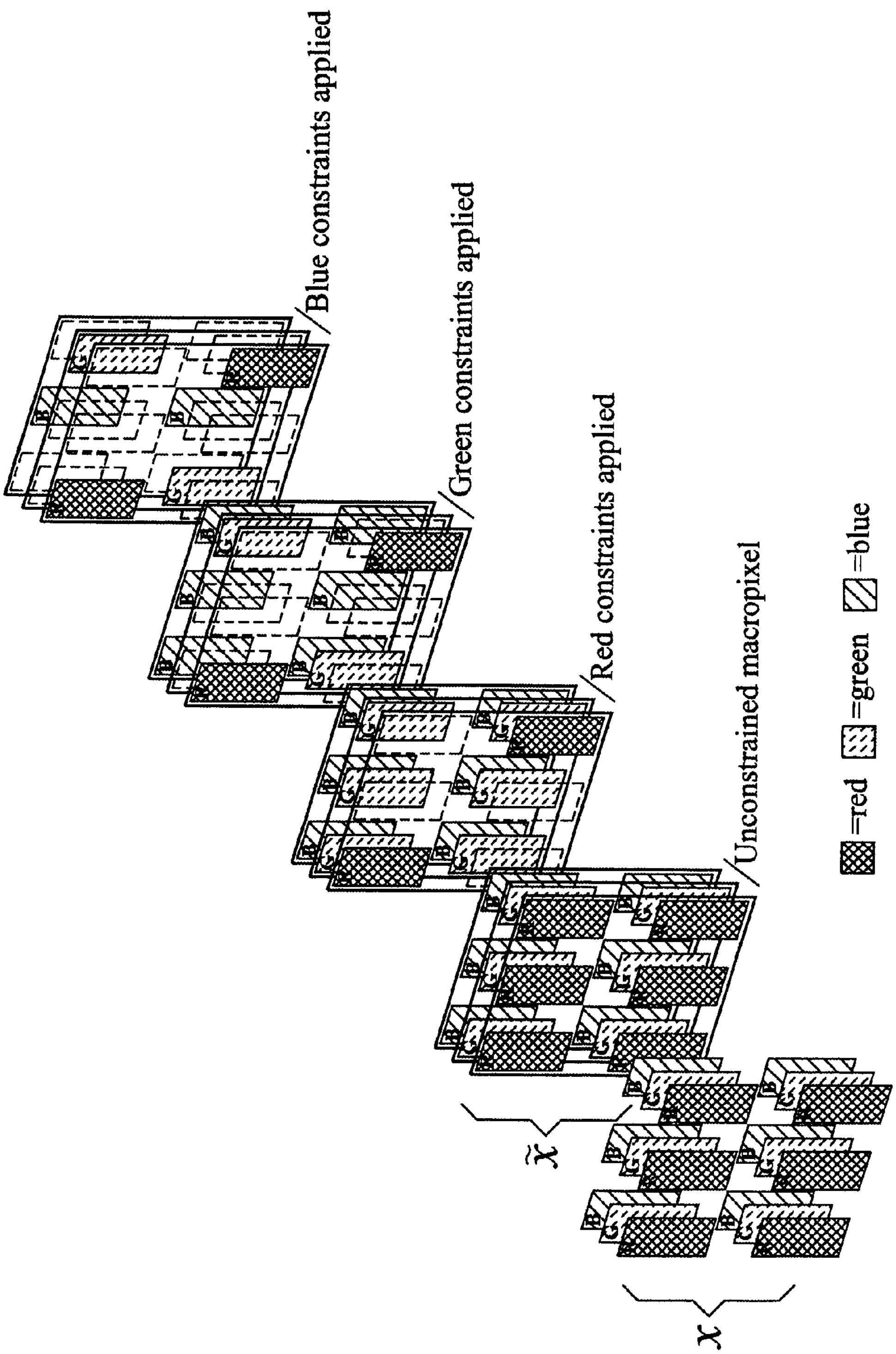
FIG. 8 illustrates constraints for a 2-dimensional pattern.

The constraints applied to an example two dimensional geometry is illustrated in FIG. 8. The target macro-pixel contains two independent red sub-pixels, two independent green sub-pixels, and a single blue sub-pixel made from two blue segments that are electrically tied together, as illustrated in FIG. 8. On the left are samples of the full color co-sited scene, x. Next is the corresponding macro-pixel from the unconstrained display, $\tilde{x}$, with sub-pixel $\tilde{x}_{m,n}$ in the upper left corner of the macro-pixel. Constraints are applied in stages for the purpose of illustration. First, four red constraints are applied:

$$G_{i_1}(\tilde{x}) = \tilde{x}^0_{m,n+1}$$
$$G_{i_2}(\tilde{x}) = \tilde{x}^0_{m,n+2}$$
$$G_{i_3}(\tilde{x}) = \tilde{x}^0_{m+1,n}$$
$$G_{i_4}(\tilde{x}) = \tilde{x}^0_{m+1,n+1}$$

Next, four green constraints, $G_{i_5}, \ldots, G_{i_8}$, are applied in a like manner, then four blue constraints, $G_{i_9}, \ldots G_{i_{12}}$. A final blue constraint, $$G_{i_{13}}(\tilde{x}) = \tilde{x}^2_{m,n+1} - \tilde{x}^2_{m+1,n+1},$$

is applied to force the remaining blue elements of the macro-pixel to function as a single sub-pixel. Prior to applying constraints, there are 18 degrees of freedom. Applying the 13 constraints results in a macro-pixel with 5 degrees of freedom that the technique can adjust to minimize perceptual error.

Figure 9:
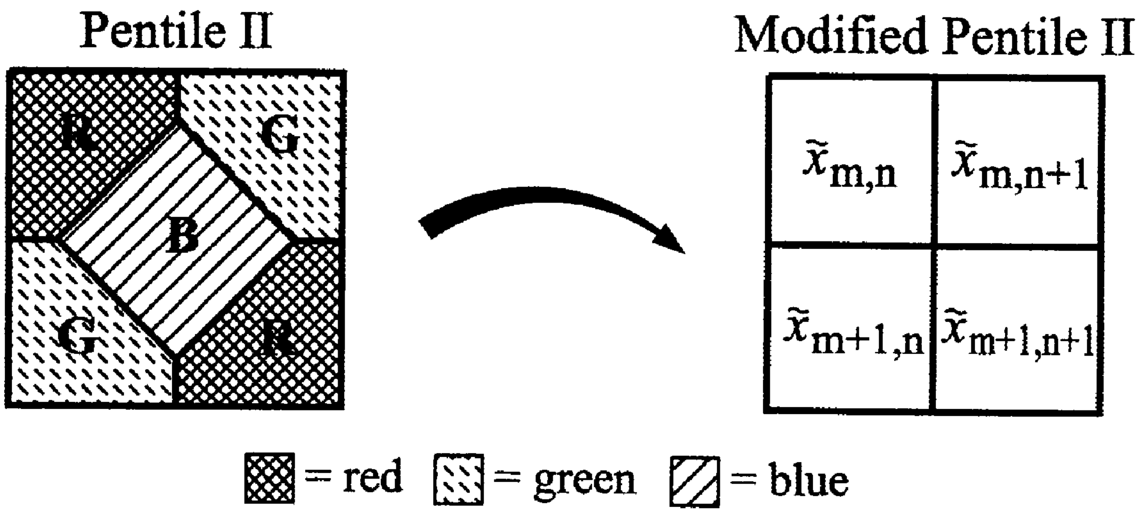
FIG. 9 illustrates a pentile pattern.

The constraints applied to another two dimensional geometry is illustrated in FIG. 9. The sub-pixels do not lie on a rectangular lattice so to facilitate the setup one may first modify the macro-pixel pattern to that shown on the right in FIG. 9. The grey patches represent unconstrained sub-pixel positions. The central blue sub-pixel has been removed and its contribution is distributed equally among the four patches via constrains.

Seven constraints on the $\tilde{x}_{m,n}$ yield the desired macro-pixel pattern. The last three constraints force the four blue elements to act as a single blue sub-pixel within the macro-pixel.

$$G_{i_1}(\tilde{x}) = \tilde{x}^1_{m,n} \tag{7}$$
$$G_{i_2}(\tilde{x}) = \tilde{x}^0_{m,n+1}$$
$$G_{i_3}(\tilde{x}) = \tilde{x}^0_{m+1,n}$$
$$G_{i_4}(\tilde{x}) = \tilde{x}^1_{m+1,n+1}$$
$$G_{i_5}(\tilde{x}) = \tilde{x}^2_{m,n} - \tilde{x}^2_{m,n+1}$$
$$G_{i_6}(\tilde{x}) = \tilde{x}^2_{m,n} - \tilde{x}^2_{m+1,n}$$
$$G_{i_7}(\tilde{x}) = \tilde{x}^2_{m,n} - \tilde{x}^2_{m+1,n+1}$$

This has five degrees of freedom, i.e., five independently adjustable sub-pixel values, remain after applying these constraints. The value of each sub-pixel is again determined by all three input color components, so that a total of 15 filter kernels will be extracted from the solution of equation 5.

Figure 10:
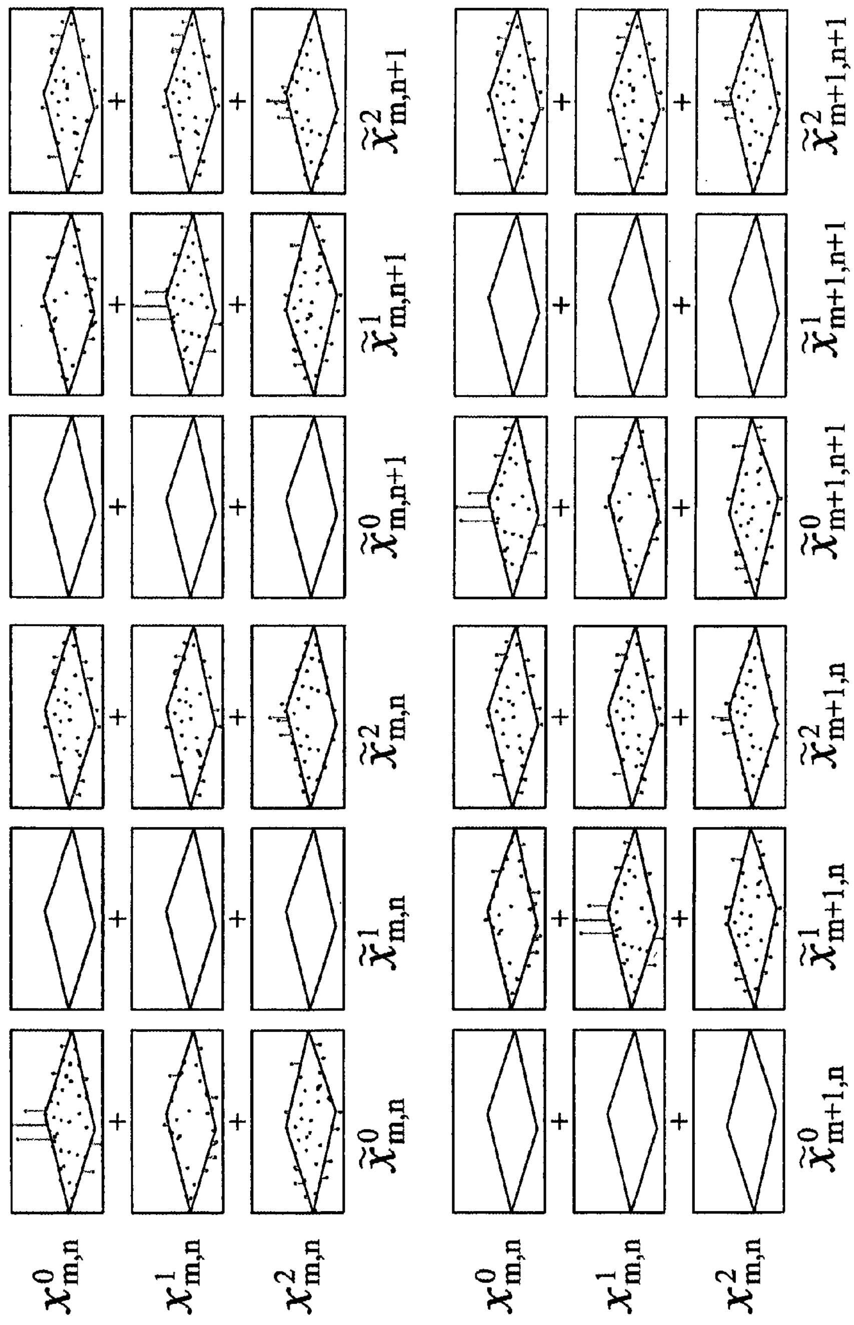
FIG. 10 illustrates two-dimensional filters.

The matrix of the filters for this geometry are shown in FIG. 10. For this example, there is shown the complete array of 36 two dimensional filters, including the 12 zero filters and the duplicate blue output filters. They are grouped into 4 sub-arrays of nine filters. Each sub-array corresponds to the collection of filters that will handle one (RGB) sub-pixel of the pattern. For example, the filter in the second row of the first column of the upper left sub-array determines the green input channel's contribution to the upper left red sub-pixel. It may be observed that all filters in, for example, the second column of this sub-array vanish. This corresponds to the fact that the green sub-pixel in the upper left position is constrained to be zero. It is also observed that the third (last) column of filters of each sub-array are the same since all blue sub-pixels are constrained to be equal. The number of distinct filters in the entire matrix is 15 which corresponds to the five available degrees of freedom and the three dimensional input color space.

Figure 1A:
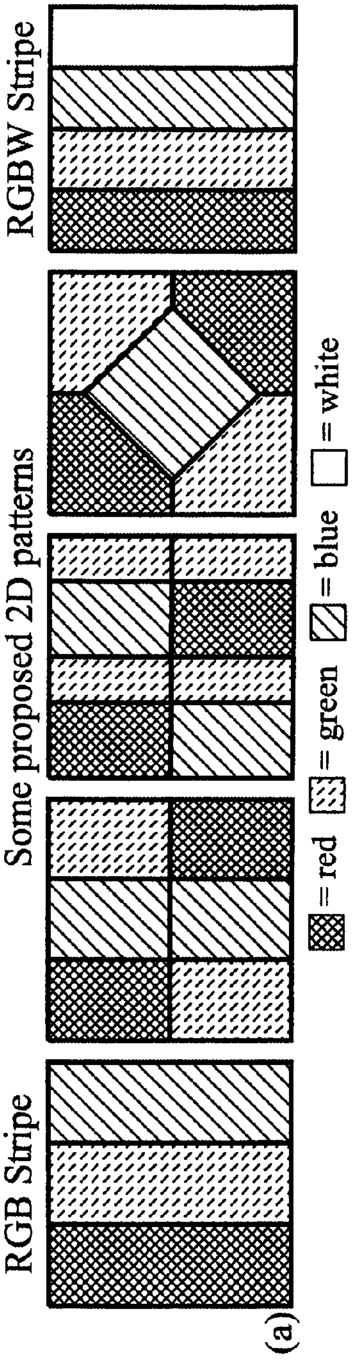
FIG. 1A illustrates some sub-pixel configurations.
Figure 1B:
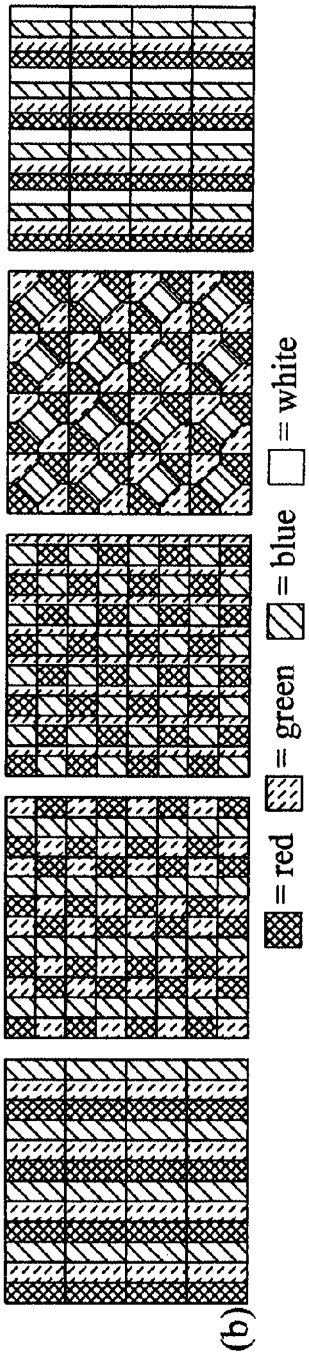
FIG. 1B illustrates 4×4 portions of displays.
Figure 2A:
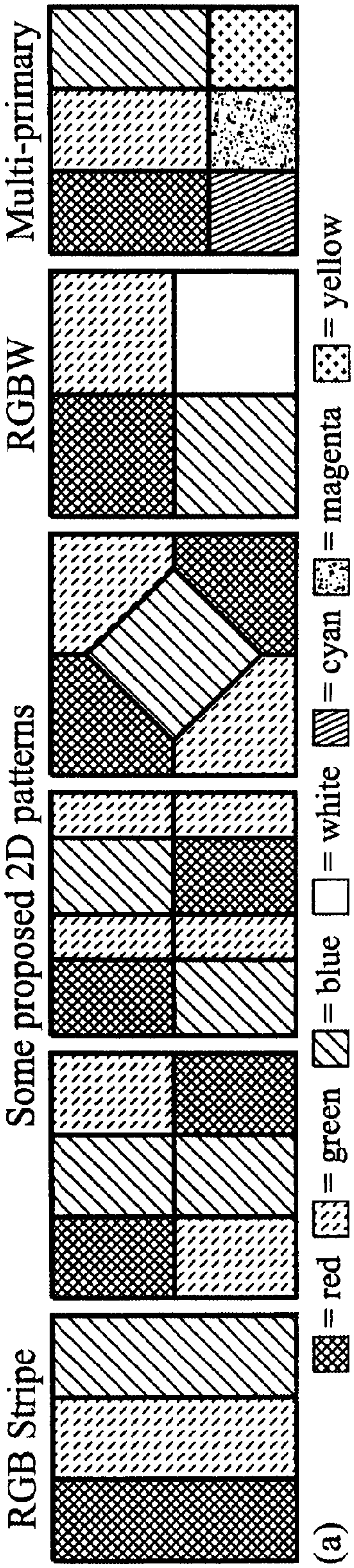
FIG. 2 illustrates five 4×4 displays with sub-pixel configurations with defective sub-pixels.
Figure 2B:
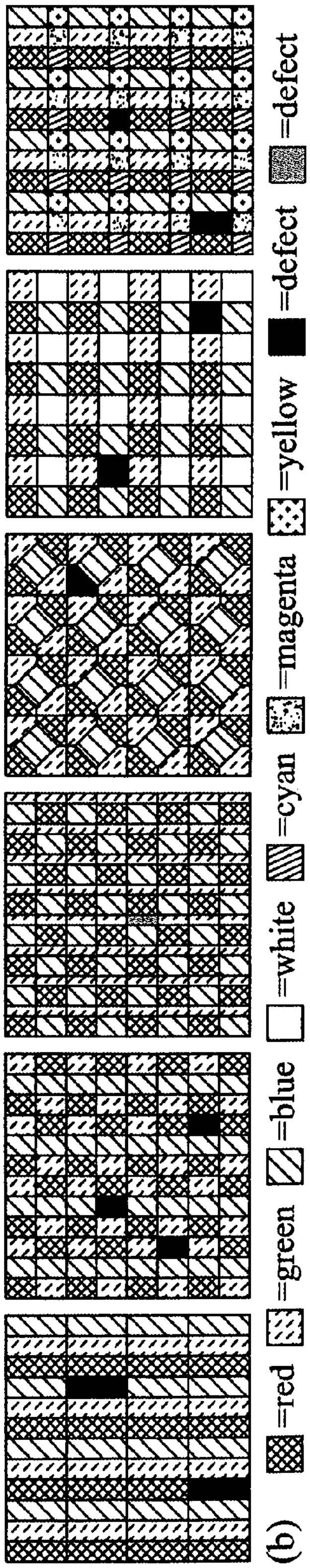
Figure 3A:
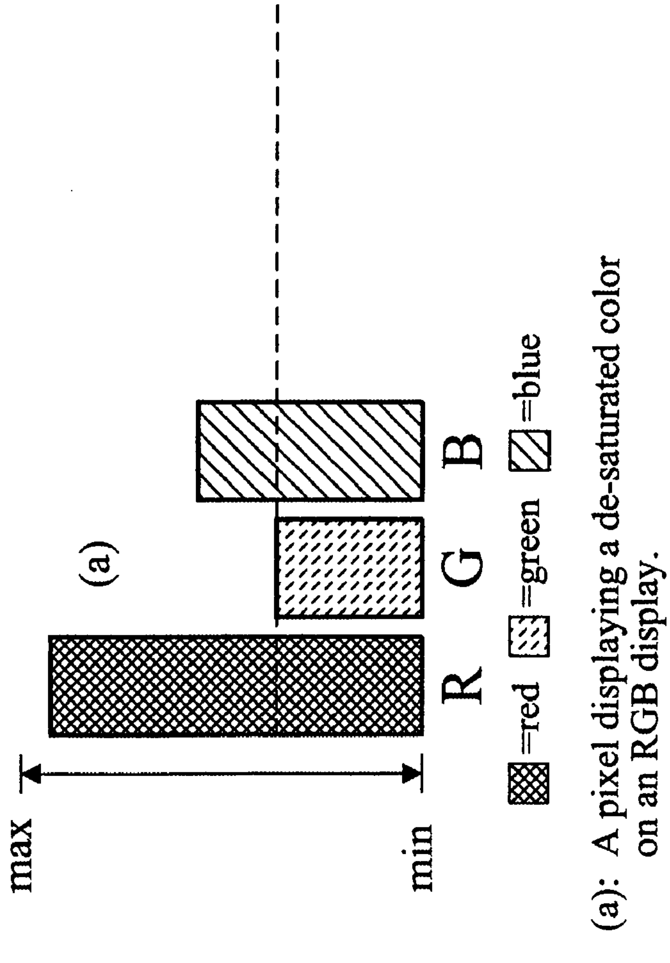
FIG. 3A illustrates a RGB pixel.
Figure 3B:
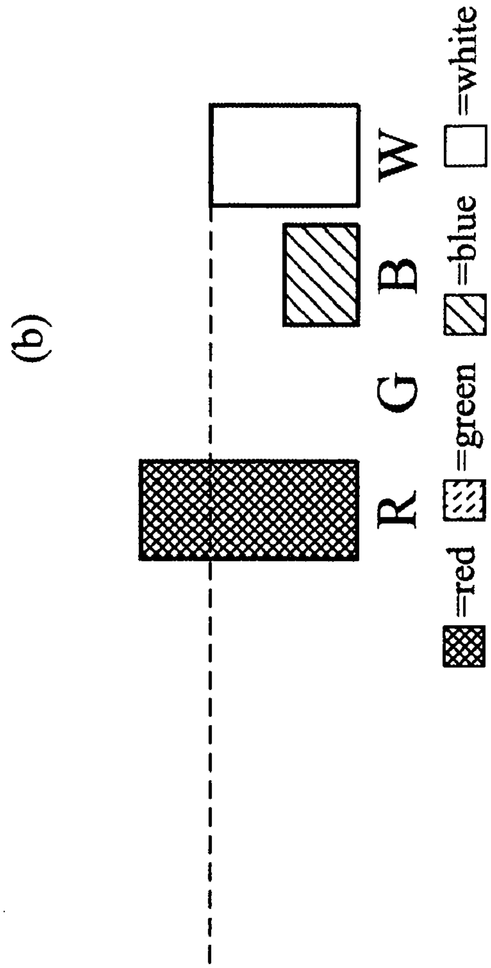
FIG. 3B illustrates the pixel of FIG. 3A incorporating a white sub-pixel.

This general constrained optimization framework may be used to mask defective sub-pixels in a visually optimal manner. There are several types of defects, as previously noted. Examples of some potential geometries are illustrated in FIG. 2A and the corresponding 4×4 display in FIG. 2B. Such defective sub-pixels may result from defective temporal gray level modulation circuitry in a plasma display or a manufacturing flaw introduced into the diode substrate of an element in an OLED panel or the TFT of a LCD panel.

The general framework provides that the sub-pixel defects can be incorporated into the framework by the addition of defect constraints similar in form to those that define the geometry itself. For example, the three always-off defects in the $2^{nd}$ panel from the left in FIG. 2A can be represented by three constraint functions listed in raster scan order, $$G_{i_1}(\tilde{x}) = \tilde{x}^2_{3,4}$$
$$G_{i_2}(\tilde{x}) = \tilde{x}^0_{5,2}$$
$$G_{i_3}(\tilde{x}) = \tilde{x}^1_{6,8}$$

in addition to the geometry constraints already discussed. The subscripts on $\tilde{x}$ are the (row, column) coordinates of the defect relative to an origin in the upper left corner. Similarly, the green always-on defect in the third panel from the left can be described by an affine constraint function, $$G_{i_1}(\tilde{x}) = 1 - \tilde{x}^1_{4,7},$$

where the intensity range of a sub-pixel is assumed to be [0.1].

The system of rendering filters that result are now shift varying, in contrast to those used for defect free rendering. The convolution of a signal with a FIR filter is usually represented algebraically by an expression like $$\tilde{x}(n) = \sum_{k=N_1}^{N_2} h(k)x(n-k)$$
$$\tilde{x}(n) = \sum_{k=n-N_2}^{n-N_1} h(n-k)x(k)$$

where $N_1 \leqq N_2$ are integers, x and $\tilde{x}$ are, respectively, the input and output signals, and h is the filter kernel of length $N_2-N_1+1$ with discrete support on the set $\{N_1, N+1, \ldots, N_2\}$.

The two summations are equivalent but the second one is suggestive of the usual graphical interpretation of convolution as a fixed input signal, x(k), over which slides (from left to right) a reversed, shift-invariant, filter kernel, h(n−k). At each potion of the kernel, the filter coefficients are multiplied by the signal and the products are added to give the output value, $\tilde{x}(n)$.

Figure 11:
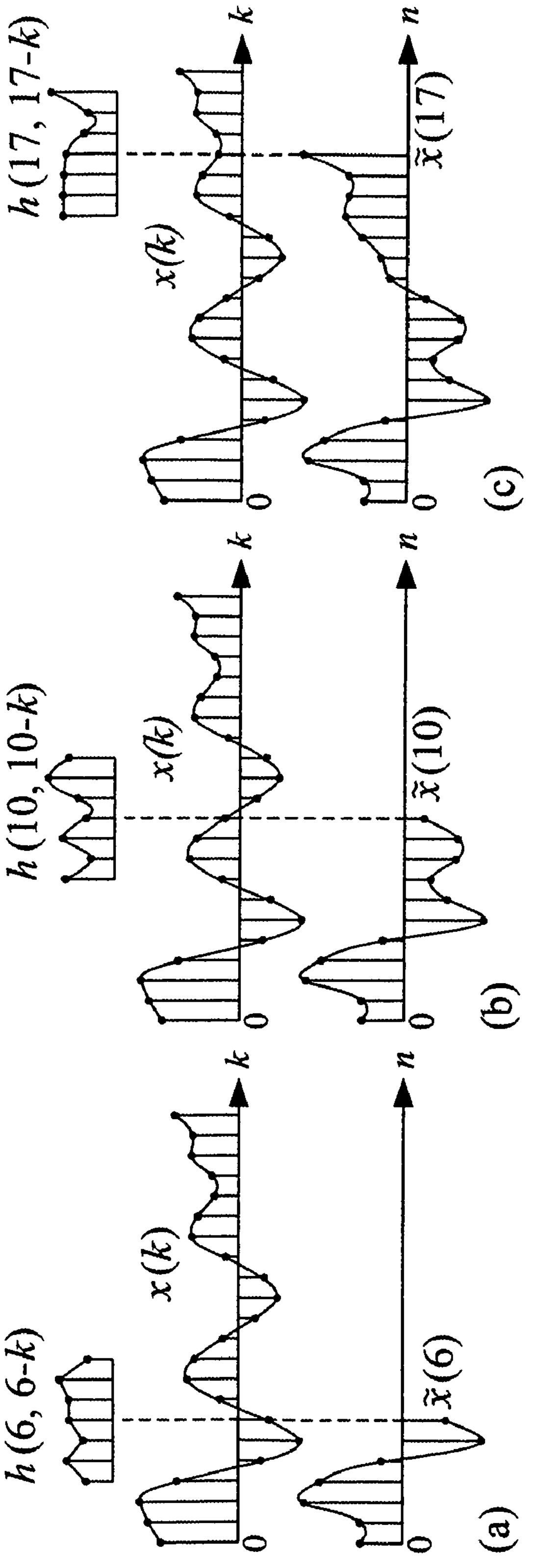
FIG. 11 illustrates linear shift-varying convolution.

A shift-varying filter is one whose kernel changes as it shifts along the input data, as illustrated in FIG. 11. Such filters are not only a function of sample index but of shift position. That is they are a function of two independent variables, formally denoted by h(n,k). From FIG. 11, it may be observed that the second variable indexes the shift position and the first selects the particular filter kernel in the family of kernels h(−,k).

An outcome of introducing defect constraints into the rendering filter design process is that the filters, which are normally shift invariant on panels with no defects, become shift-varying when one or more defect constrains are introduced. This is a consequence of the defects not being regularly tessellated on the display as in the sub-pixel pattern of the macro-pixels.

Figure 12:
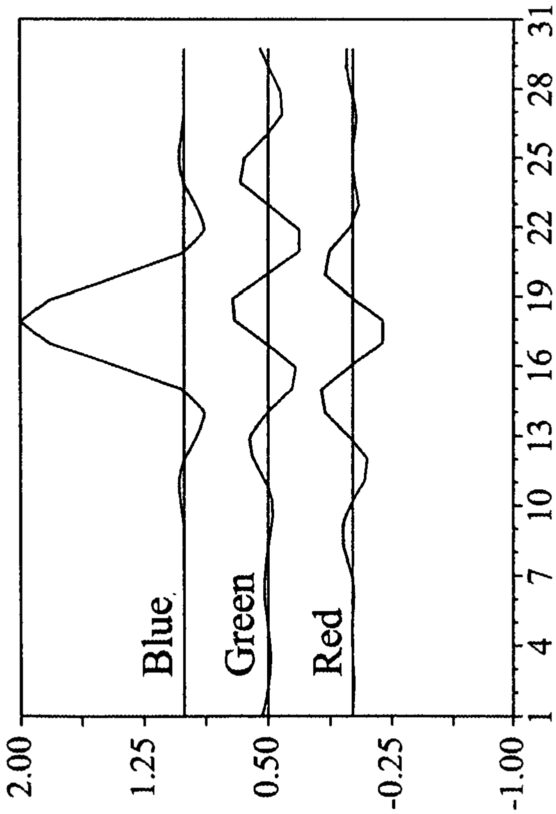
FIG. 12 illustrates shift-invariant optimal rendering filters.

The plots of FIG. 12 show an example of optimal rendering filters for the blue color plane of a one-dimensional striped display that is without defects. The three graphs correspond to three of the nine scalar filters in the matrix rendering filter of equation 6. Shown from bottom is top in the figure to the bottom row, $[h_{r\rightarrow b}, h_{g\rightarrow b}, h_{b\rightarrow b}]$, of filters in the matrix that render the blue color plane. The three shift-invariant filters are shown at one position along a scan line (center tap over sub-pixel number 18) as they are convolved with their respective input data. As these filters participate in the rendering operation, their shape remains fixed so one need only show them for one position along a scan line.

Figure 13:
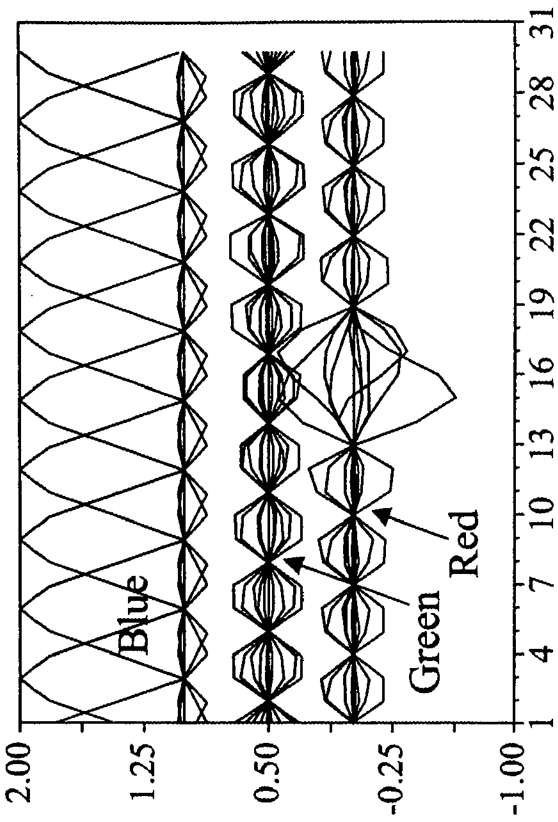
FIG. 13 illustrates collection of shift-varying filter kernels.

On the other hand, when rendering onto a panel with blue sub-pixel defect at sub-pixel number 18, the shapes of these filters vary considerably in the vicinity of the defective sub-pixel, as shown for the different positions of the filter kernels shown in FIG. 13.

It is noteworthy that the kernel whose position corresponds to shift position 18 is identically zero. This is expected because the technique has set the blue output to zero at this point. Another observation is that as the defect masking filters move away from the defect, they converge to the shape of the invariant rendering filters. The implication is that the rendering filters and the masking filters can be combined to operate in a seamless way along the scan line without any 'boundary transition' artifacts.

The shift varying nature of the defect masking filters gives them a certain intelligence as they render the sub-pixels in the vicinity of a defect so as to mask its visibility from the viewer who is looking at the panel from a normal viewing distance. This intelligence derives from the fact that the weighting functions used in the rendering filter design process are preferably based on the CSFs of the human visual system and therefore have contained within them the relative sensitivity of the HVS to grey scale and color detail. This is shown by the theoretical luminance and chrominance CSF curves plotted in FIG. 14.

The behavior of the rendering filters is depicted in FIG. 15. In masking the effects of a defect on luminance and color, the sub-pixels that are nearest the defect are automatically used to compensate for the luminance error because, otherwise, the viewer would see the masking as an artifact. On the other hand, the viewer's relative insensitivity to color detail allows the rendering filters to modulate the color of the sub-pixels further away from the defect to compensate for the color error introduced jointly from the defect and from the effect of the luminance compensation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of adjusting an image to be displayed on a display having at least one defective sub-pixel:

(a) receiving an image;

(b) modifying said image with at least one filter that implements an optimization of a function comprising:

(i) an error function of the $L_2$ norms of the weighted Fourier color components of a transformed image signal; and (ii) at least one constraint not implicit in the expression of the function that said at least one filter optimizes;

where said at least one filter reduces a perceptually relevant metric to reduce the appearance of said at least one defective sub-pixel; and (c) displaying said image on said display.

2. The method of claim 1 wherein said at least one constraint is dependent on a sub-pixel geometry of said display.

3. The method of claim 1 wherein said function optimized by at least one filter is an equality between the gradient of said error function of said $L_2$ norms, and the sum of weighted gradients of respective ones of said at least one constraint.

4. The method of claim 3 wherein said filter is based upon an array of one-dimensional re-sampling filters.

5. The method of claim 1 wherein said metric models the contrast sensitivity function of the human visual system's luminance response.

6. The method of claim 1 wherein said metric models the luminance sensitivity function of the human visual system's chrominance response.

7. The method of claim 3 wherein said gradients are each weighted by a Lagrange multiplier.

8. The method of claim 1 wherein said optimization is based upon Lagrange constraints.

9. The method of claim 1 wherein said optimization is based upon a transform into an enhanced color space.

10. The method of claim 1 wherein said error function is a perceptual error function.

11. The method of claim 10 wherein said optimization is based upon at least one perceptual weight function.

12. The method of claim 11 wherein said optimization is based upon a plurality of perceptual weight functions.

13. A method of adjusting an image to be displayed on a display having at least one defective sub-pixel:

(a) receiving an image;

(b) modifying said image to reduce the appearance of said at least one defective sub-pixel, wherein said display has a two dimensional sub-pixel pattern that has a first pattern of different colored sub-pixels in the horizontal direction and a second pattern of different colored sub-pixels in the vertical direction, different from said first pattern, and where said step of modifying is based at least in part on the difference between said first pattern and said second pattern, said modification based upon an optimization which reduces a perceptually relevant metric, said optimization being of a function comprising:

(i) an error function of the $L_2$ norms of the weighted Fourier color components of a transformed image signal; and (ii) at least one constraint not implicit in the expression of the function optimized; and (c) displaying said image on said display.

* * * * *